United States Patent
Gutierrez et al.

(10) Patent No.: US 11,550,627 B2
(45) Date of Patent: Jan. 10, 2023

(54) HARDWARE ACCELERATED DYNAMIC WORK CREATION ON A GRAPHICS PROCESSING UNIT

(71) Applicant: ADVANCED MICRO DEVICES, INC., Santa Clara, CA (US)

(72) Inventors: Anthony Gutierrez, Bellevue, WA (US); Sooraj Puthoor, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 17/215,171

(22) Filed: Mar. 29, 2021

(65) Prior Publication Data

US 2021/0216368 A1 Jul. 15, 2021

Related U.S. Application Data

(63) Continuation of application No. 16/134,695, filed on Sep. 18, 2018, now Pat. No. 10,963,299.

(51) Int. Cl.
*G06F 9/48* (2006.01)
*G06F 9/54* (2006.01)
*G06F 9/38* (2018.01)

(52) U.S. Cl.
CPC .......... *G06F 9/4881* (2013.01); *G06F 9/3877* (2013.01); *G06F 9/542* (2013.01); *G06F 9/545* (2013.01); *G06F 9/546* (2013.01)

(58) Field of Classification Search
CPC .... G06F 9/4806; G06F 9/4881; G06F 9/4843; G06F 9/4887; G06F 9/48; G06F 9/38
See application file for complete search history.

(56) References Cited

U.S. PATENT DOCUMENTS

| | | | |
|---|---|---|---|
| 9,430,281 B2 | 8/2016 | Sander et al. | |
| 9,830,163 B2 | 11/2017 | Boudier | |
| 2016/0055612 A1* | 2/2016 | Barik | G06F 3/14 |
| | | | 345/522 |
| 2016/0239346 A1* | 8/2016 | Kipp | G06F 9/5027 |
| 2016/0371116 A1* | 12/2016 | Sander | G06F 9/4881 |
| 2017/0192921 A1* | 7/2017 | Wang | G06F 13/1673 |
| 2017/0236246 A1* | 8/2017 | Mrozek | G06T 1/20 |
| | | | 345/522 |
| 2018/0293096 A2* | 10/2018 | Iniguez | G06F 9/544 |
| 2020/0050451 A1* | 2/2020 | Babich | G06F 15/163 |

OTHER PUBLICATIONS

J.C. Mogul, J. Mudigonda, N. Binkert, P. Ranganathan, and V. Talwar. "Using Asymmetric Single-ISA CMPs to Save Energy on Operating Systems", in IEEE Micro, vol. 28, No. 3, pp. 26-41, May-Jun. 2008.

* cited by examiner

*Primary Examiner* — Brian W Wathen

(57) ABSTRACT

A processor core is configured to execute a parent task that is described by a data structure stored in a memory. A coprocessor is configured to dispatch a child task to the at least one processor core in response to the coprocessor receiving a request from the parent task concurrently with the parent task executing on the at least one processor core. In some cases, the parent task registers the child task in a task pool and the child task is a future task that is configured to monitor a completion object and enqueue another task associated with the future task in response to detecting the completion object. The future task is configured to self-enqueue by adding a continuation future task to a continuation queue for subsequent execution in response to the future task failing to detect the completion object.

20 Claims, 9 Drawing Sheets

HARDWARE ACCELERATED DYNAMIC WORK CREATION ON A GRAPHICS PROCESSING UNIT

CROSS-REFERENCE TO RELATED APPLICATIONS

The present application is a continuation application of U.S. patent application Ser. No. 16/134,695, entitled "HARDWARE ACCELERATED DYNAMIC WORK CREATION ON A GRAPHICS PROCESSING UNIT", and filed on Sep. 18, 2018, the entirety of which is incorporated by reference herein.

STATEMENT OF SPONSORED RESEARCH

This invention was made with Government support under PathForward Project with Lawrence Livermore National Security (Prime Contract No. DE-AC52-07NA27344, Subcontract No. B620717) awarded by DOE. The Government has certain rights in this invention."

BACKGROUND

Conventional processing systems include a central processing unit (CPU) and a graphics processing unit (GPU). The CPU typically hosts an operating system (OS) and handles memory management tasks such as allocating virtual memory address spaces, configuring page tables including virtual-to-physical memory address translations, managing translation lookaside buffers, memory management units, input/output memory management units, and the like. The CPU also launches kernels for execution on the GPU, e.g., by issuing draw calls. The GPU typically implements multiple compute units that allow the GPU to execute the kernel as multiple threads executing the same instructions on different data sets. The threads are grouped into workgroups that are executed concurrently or in parallel on corresponding compute units. Conventional GPUs implement bulk synchronous models of kernel execution in which data-parallel kernels are written to the GPU to be executed on the GPU. For example, the CPU can transmit an Architected Queuing Language (AQL) packet that describes the kernel using parameters including an address of the GPU code, register allocation requirements, a size of a local data store (LDS), a size of a workgroup, initial register state information, argument buffer pointers, and the like.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
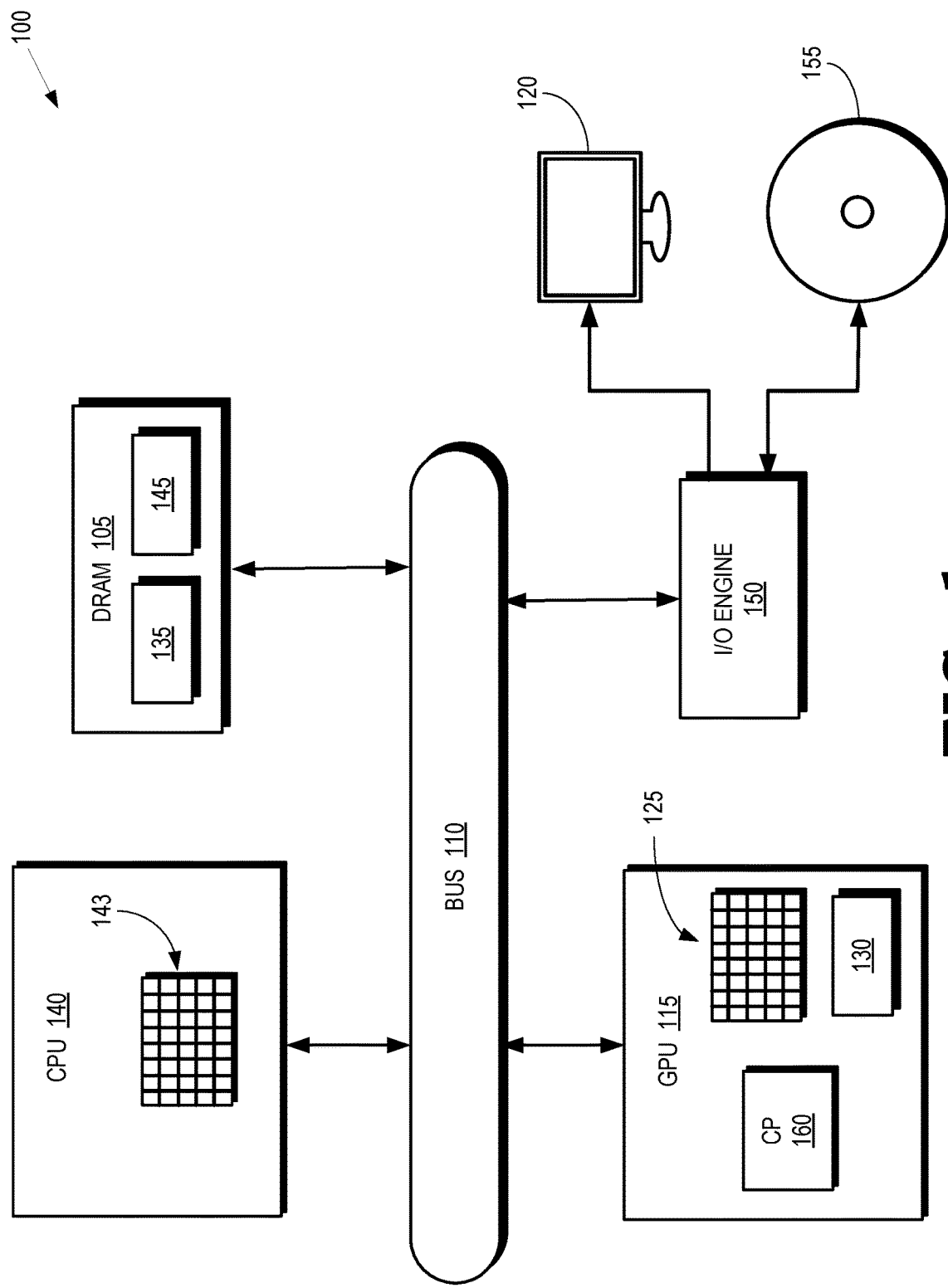
FIG. 1 is a block diagram of a processing device in accordance with some embodiments.

Kernels are queued for execution on a GPU from within a GPU kernel using techniques such as CUDA dynamic parallelism or device enqueue on OpenCL or ROCm. The tasks that are launched using these device-side techniques are represented as full kernels and therefore require the full kernel launch procedure that is performed by the CPU, as discussed herein. The performance of these device-side enqueue techniques is also limited by the requirement that information must be written to memory to initiate enqueueing of the task, which increases latency due to the logical and physical separation of the memory and the GPU.

FIGS. 1-9 disclose techniques for dynamic work creation, dispatch, and scheduling in a GPU that includes an additional coprocessor to maintain data structures that describe a task and respond to requests for dynamic work creation from tasks that are executing on the GPU. Threads executing on the coprocessor generate new (child) tasks and dispatch the child tasks to the GPU in response to requests from an executing (parent) task. Some embodiments of the coprocessor manage a task pool that includes one or more child tasks that are registered in the task pool by a corresponding parent task. The child tasks are then selectively dispatched for execution in response to detecting an event associated with the child task. In some embodiments, the child tasks are added to a queue associated with its triggering event. The child tasks in the queues are scheduled and dispatched in response to the coprocessor detecting the event. In other embodiments, the child tasks are stored in an associative memory structure that associates the child tasks with priorities that are used to determine which child task is selected for dispatch from the task pool in response to an event. The child tasks are scheduled and dispatched based on their priorities in response to the coprocessor detecting the event. Events are associated with completion objects such as signals (e.g., predetermined memory locations), interrupts, or polling of memory addresses. The child tasks in the task pool can be kernels or workgroups that are added to an execution context of the parent task. In response to detecting an event, the coprocessor dispatches a task from a corresponding queue in the task pool.

Some embodiments of the task pool include future tasks that monitor a completion object and then enqueue another task (which could be a CPU task or a GPU task) associated with the future task in response to detecting the completion object. If the future task has not detected the completion object, the future task "self-enqueues" by adding a continuation future task to a continuation queue for subsequent execution. For example, a future task can be defined by a function pointer and a pointer to the function argument, which includes a pointer to the completion object of the future task. The continuation future task includes the same function pointer and pointer to the function argument. This process is iterated until the future task detects the completion object. In some embodiments, a parent task executing on the GPU sends a request to the coprocessor to create and dispatch a child task as a workgroup in the execution context of the parent task. The newly spawned child task can execute synchronously or asynchronously with respect to the parent task. Some embodiments of the coprocessor implement operating system (OS) micro kernels to schedule tasks, manage the state associated with the task, or interrupt tasks that are currently executing.

FIG. 1 is a block diagram of a processing device 100 in accordance with some embodiments. The processing system 100 includes or has access to a memory 105 or other storage component that is implemented using a non-transitory computer readable medium such as a dynamic random access memory (DRAM). However, the memory 105 can also be implemented using other types of memory including static random access memory (SRAM), nonvolatile RAM, and the like. The processing system 100 also includes a bus 110 to support communication between entities implemented in the processing system 100, such as the memory 105. Some embodiments of the processing system 100 include other buses, bridges, switches, routers, and the like, which are not shown in FIG. 1 in the interest of clarity.

The processing system 100 includes a graphics processing unit (GPU) 115 that is configured to render images for presentation on a display 120. For example, the GPU 115 can render objects to produce values of pixels that are provided to the display 120, which uses the pixel values to display an image that represents the rendered objects. Some embodiments of the GPU 115 can also be used for general purpose computing. In the illustrated embodiment, the GPU 115 implements multiple processing elements (also referred to as compute units) 125 that are configured to execute instructions concurrently or in parallel. The GPU 115 also includes an internal (or on-chip) memory 130 that includes a local data store (LDS), as well as caches, registers, or buffers utilized by the processing elements 125. The internal memory 130 stores data structures that describe parent tasks executing on one or more of the processing elements 125. In the illustrated embodiment, the GPU 115 communicates with the memory 105 over the bus 110. However, some embodiments of the GPU 115 communicate with the memory 105 over a direct connection or via other buses, bridges, switches, routers, and the like. The GPU 115 can execute instructions stored in the memory 105 and the GPU 115 can store information in the memory 105 such as the results of the executed instructions. For example, the memory 105 can store a copy 135 of instructions from a program code that is to be executed by the GPU 115.

The processing system 100 also includes a central processing unit (CPU) 140 that is connected to the bus 110 and can therefore communicate with the GPU 115 and the memory 105 via the bus 110. In the illustrated embodiment, the CPU 140 implements multiple processing elements (also referred to as processor cores) 143 that are configured to execute instructions concurrently or in parallel. The CPU 140 can execute instructions such as program code 145 stored in the memory 105 and the CPU 140 can store information in the memory 105 such as the results of the executed instructions. The CPU 140 is also able to initiate graphics processing by issuing draw calls to the GPU 115.

An input/output (I/O) engine 150 handles input or output operations associated with the display 120, as well as other elements of the processing system 100 such as keyboards, mice, printers, external disks, and the like. The I/O engine 150 is coupled to the bus 110 so that the I/O engine 150 communicates with the memory 105, the GPU 115, or the CPU 140. In the illustrated embodiment, the I/O engine 150 is configured to read information stored on an external storage component 155, which is implemented using a non-transitory computer readable medium such as a compact disk (CD), a digital video disc (DVD), and the like. The I/O engine 150 can also write information to the external storage component 155, such as the results of processing by the GPU 115 or the CPU 140.

In operation, the CPU 140 issues commands or instructions (referred to herein as "draw calls") to the GPU 115 to initiate processing of a kernel that represents the program instructions that are executed by the GPU 115. Multiple instances of the kernel, referred to herein as threads or work items, are executed concurrently or in parallel using subsets of the processing elements 125. In some embodiments, the threads execute according to single-instruction-multiple-data (SIMD) protocols so that each thread executes the same instruction on different data. The threads can be collected into workgroups that are executed on different processing elements 125. Although techniques exist for launching tasks from within a kernel, the parent task is typically required to finish execution before the child task is launched, regardless of whether or not the tasks require explicit synchronization. The child tasks are typically represented as full kernels and require full kernel launch, which does not allow tasking at finer levels of granularities such as workgroups or threads. Conventional techniques for adding a task to a queue require writing a request to the memory 105 to initiate task enqueuing, which add significant latency to the procedure due to the physical and logical separation of the GPU 115 and the memory 105.

At least in part to address these problems in the conventional practice, the GPU 115 includes a coprocessor 160 that receives task requests from parent tasks that are executing on one or more of the processing elements 125. In response to receiving the task request, the coprocessor 160 dispatches child tasks to the one or more of the processing elements 125. In some embodiments, the parent task registers the child task in a task pool that is managed by the coprocessor 160. The child task in the task pool is added to a queue associated with an event and child task is scheduled/dispatched in response to the coprocessor detecting the event, e.g., by monitoring a completion object associated with the event. In some embodiments, the child task is a future task that is associated with a completion object and another task, which may be executed on the GPU 115 or the CPU 140. The future task monitors the completion object and enqueues the other task in response to detecting the completion object. In some cases, the future task self-enqueues by adding a continuation future task to a continuation queue for subsequent execution in response to the future task failing to detect the completion object. For example, the future task can monitor the completion object for a predetermined time interval and then self-enqueue in response to failing to detect the completion object within the predetermined time interval.

Figure 2:
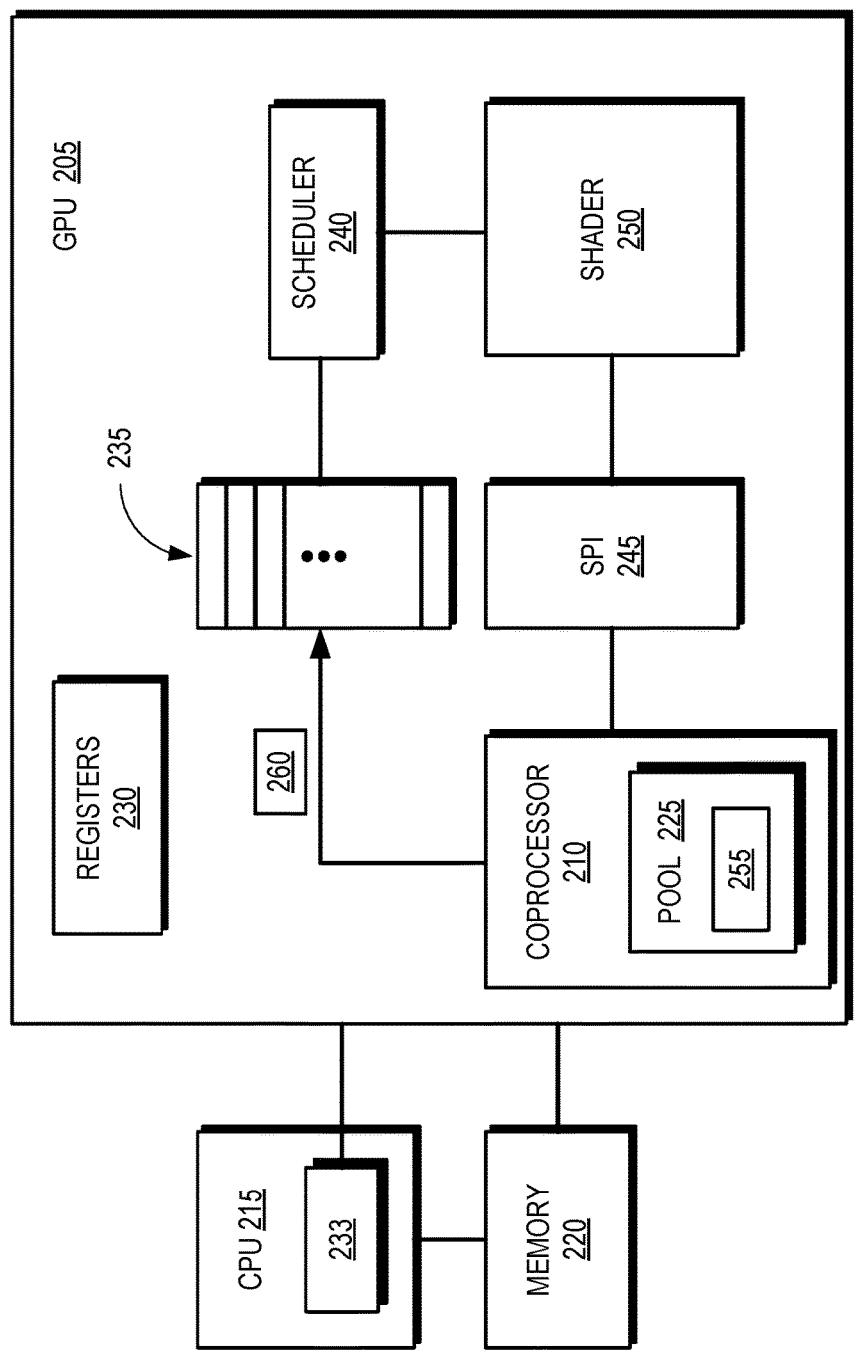
FIG. 2 is a block diagram of a processing system that includes a graphics processing unit (GPU) with an integrated coprocessor according to some embodiments.

FIG. 2 is a block diagram of a processing system 200 that includes a GPU 205 with an integrated coprocessor 210 according to some embodiments. The processing system 200 also includes a CPU 215 and an external memory 220 such as a DRAM. The processing system 200 therefore represents some embodiments of the processing system 100 shown in FIG. 1. The coprocessor 210 manages a memory pool 225. The coprocessor 210 therefore allocates or deallocates memory from the pool on behalf of kernels executing on the GPU 205. Some embodiments of the coprocessor 210 allocate memory in an address space of a process that owns the kernel via a runtime or operating system (OS) software that executes on the host CPU 215. Configuration of the GPU 205, including memory allocations, is specified by information stored in registers 230. For example, a driver 233 in the CPU 215 provides code for execution on the coprocessor 210 and initially allocates memory by providing configuration information that is stored in the registers 230.

The CPU 215 dispatches work to the GPU 205 by sending packets such as Architected Queuing Language (AQL) packets that describe a kernel that is to be executed on the GPU 205. Some embodiments of the packets include an address of code to be executed on the GPU 205, register allocation requirements, a size of a Local Data Store (LDS), workgroup sizes, configuration information defining an initial register state, pointers to argument buffers, and the like. The packet is enqueued by writing the packet to a queue 235 such as an AQL queue. A doorbell signal is "rung" by writing information to a predetermined memory location that is monitored by a scheduler 240 the GPU 205. Some embodiments of the scheduler 240 are implemented using a collection of microcontrollers. In response to detecting the doorbell signal, the scheduler 240 schedules a corresponding entry in the queue 235 for dispatch, extracts information from the corresponding packet, and schedules work to the GPU 205 via communication with a dispatcher such as a shader pipe interface (SPI) 245. For example, the work can be scheduled for execution on a shader 250 that is implemented using one or more processing elements of the GPU 205. The GPU notifies the SPI 245 in response to the kernel completing execution. The SPI 245 then processes an end of pipe (EOP) packet and removes the task from the queue 235.

The coprocessor 210 also implements dynamic task scheduling to allow a parent task to spawn a child task concurrently with the parent task executing on the GPU 210. In some embodiments, the parent task registers the child task in the task pool 225. The child task in the task pool is added to a memory structure 255 associated with an event and the child task is scheduled/dispatched in response to the coprocessor detecting the event. Some embodiments of the memory structure 255 are implemented as a set of queues associated with corresponding events. The child tasks are added to a queue in the memory structure 255 that is associated with a triggering event for the child task. The child tasks in the queues of the memory structure 255 are scheduled and dispatched in response to the coprocessor 210 detecting the event. Some embodiments of the memory structure 255 are implemented as an associative memory structure that associates the child tasks with priorities that are used to determine which child task is selected for dispatch from the task pool 225 in response to an event. The child tasks are scheduled and dispatched based on their priorities in response to the coprocessor 210 detecting the event.

In some embodiments, the child task is a future task that is associated with a completion object and another task, which may be executed on the GPU 205 or the CPU 215. The future task monitors the completion object and enqueues the other task in response to detecting the completion object. In some cases, the future task self-enqueues by adding a continuation future task to a continuation queue for subsequent execution in response to the future task failing to detect the completion object. For example, the future task self-enqueues by enqueuing a packet 260 (such as an AQL packet) in the queue 235. The packet 260 includes the same information as an original packet that was enqueued in the queue 235 for the future task. The continuation future task defined by the packet 260 is eventually dispatched to perform monitoring of the completion object. If the continuation future task does not detect the completion object, the self-enqueuing process iterates until an instance of the continuation future task detects the completion object.

Figure 3:
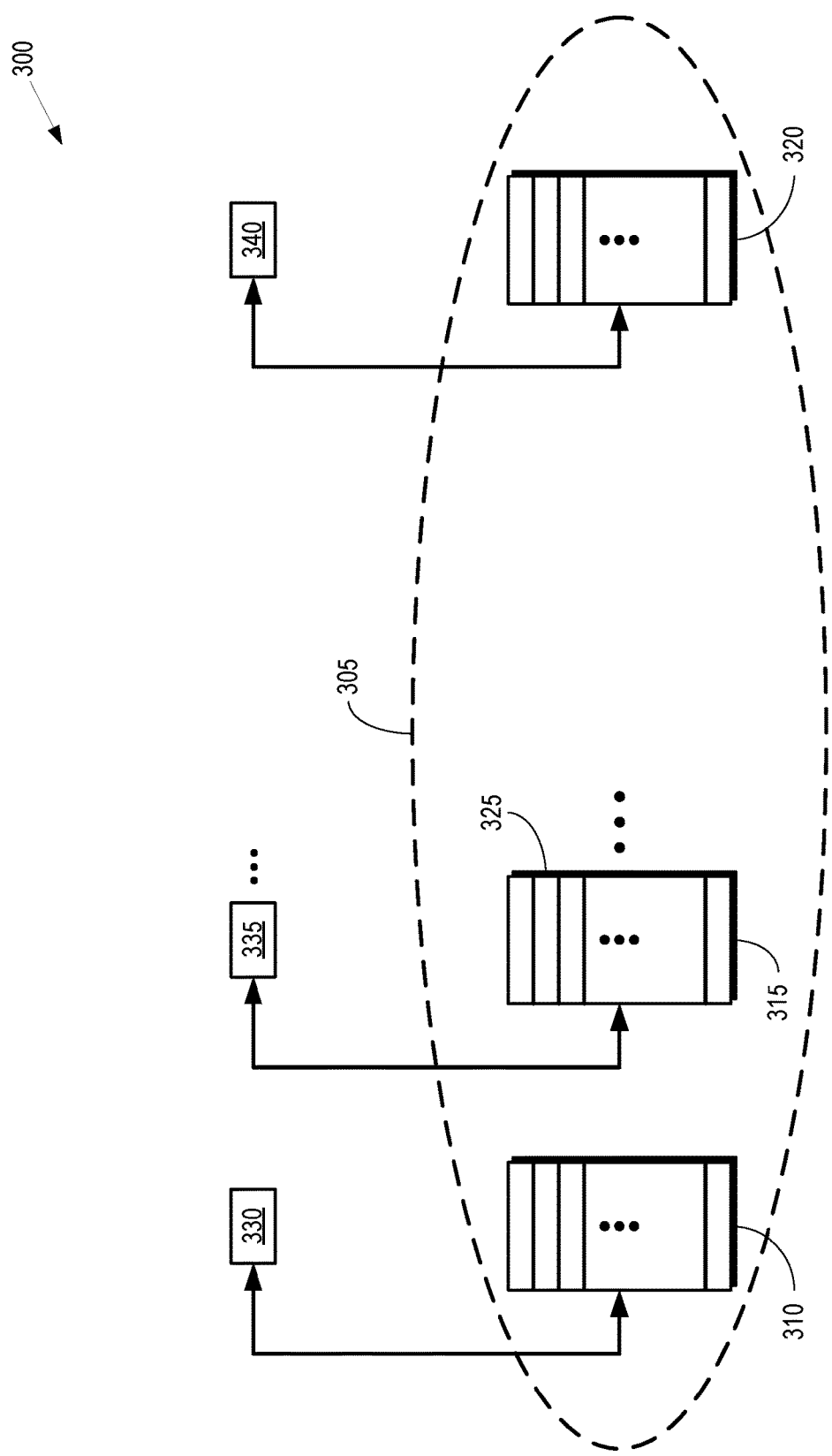
FIG. 3 is a block diagram of a memory that is used for pooling child tasks that are spawned by a parent task according to some embodiments.

FIG. 3 is a block diagram of a memory 300 that is used for pooling child tasks that are spawned by a parent task according to some embodiments. The memory 300 is implemented in some embodiments of the processing system 100 shown in FIG. 1 and the processing system 200 shown in FIG. 2. The memory 300 is implemented in a single memory device such as the internal memory 130 shown in FIG. 1 and the memory pool 225 shown in FIG. 2 or the memory 300 is distributed over multiple memory devices that can include the memory 105 shown in FIG. 1 and the memory 220 shown in FIG. 2.

The memory 300 includes a task pool 305 for queuing tasks for subsequent dispatch, e.g., to a GPU for execution. A coprocessor such as the coprocessor 160 shown in FIG. 1 and the coprocessor 210 shown in FIG. 2 manages the task pool on a per-process basis or on a per-task basis using a different task pool for each task that is running on the GPU, which is useful for providing a task parallel, event-based programming model such as C++ executors, as discussed herein. Event queues 310, 315, 320 hold tasks 325 (only one indicated by a reference numeral in the interest of clarity) that have been enqueued for subsequent dispatch. Scheduling restrictions, data dependencies, and priorities can be associated with the tasks 325 in the task pool 305.

The event queues 310, 315, 320 are associated with corresponding completion objects 330, 335, 340. In some embodiments, the completion objects 330, 335, 340 are implemented as signals such as writing to a predetermined location in a memory, interrupts, or polling of predetermined memory addresses. The completion objects 330, 335, 340 indicate occurrence of an event and the completion object 330, 335, 340 are monitored to determine whether the event occurred. Tasks 325 that are to be scheduled in response to occurrence of an event are added to the corresponding event queue 310, 315, 320. For example, a task that is scheduled in response to occurrence of an event indicated by the completion object 330 is added to the event queue 310. For another example, a task that is scheduled in response to occurrence of an event indicated by the completion object 335 is added to the event queue 315. For yet another example, a task that is scheduled in response to occurrence of an event indicated by the completion object 340 is added to the event queue 320. When a currently executing task triggers an event, the coprocessor pops a task off the corresponding event queue and dispatches it to the GPU as a packet such as an AQL packet. The task created from the newly dispatched AQL packet can be an entire kernel, a workgroup added to an execution context of the parent task, or other granularity.

Figure 4:
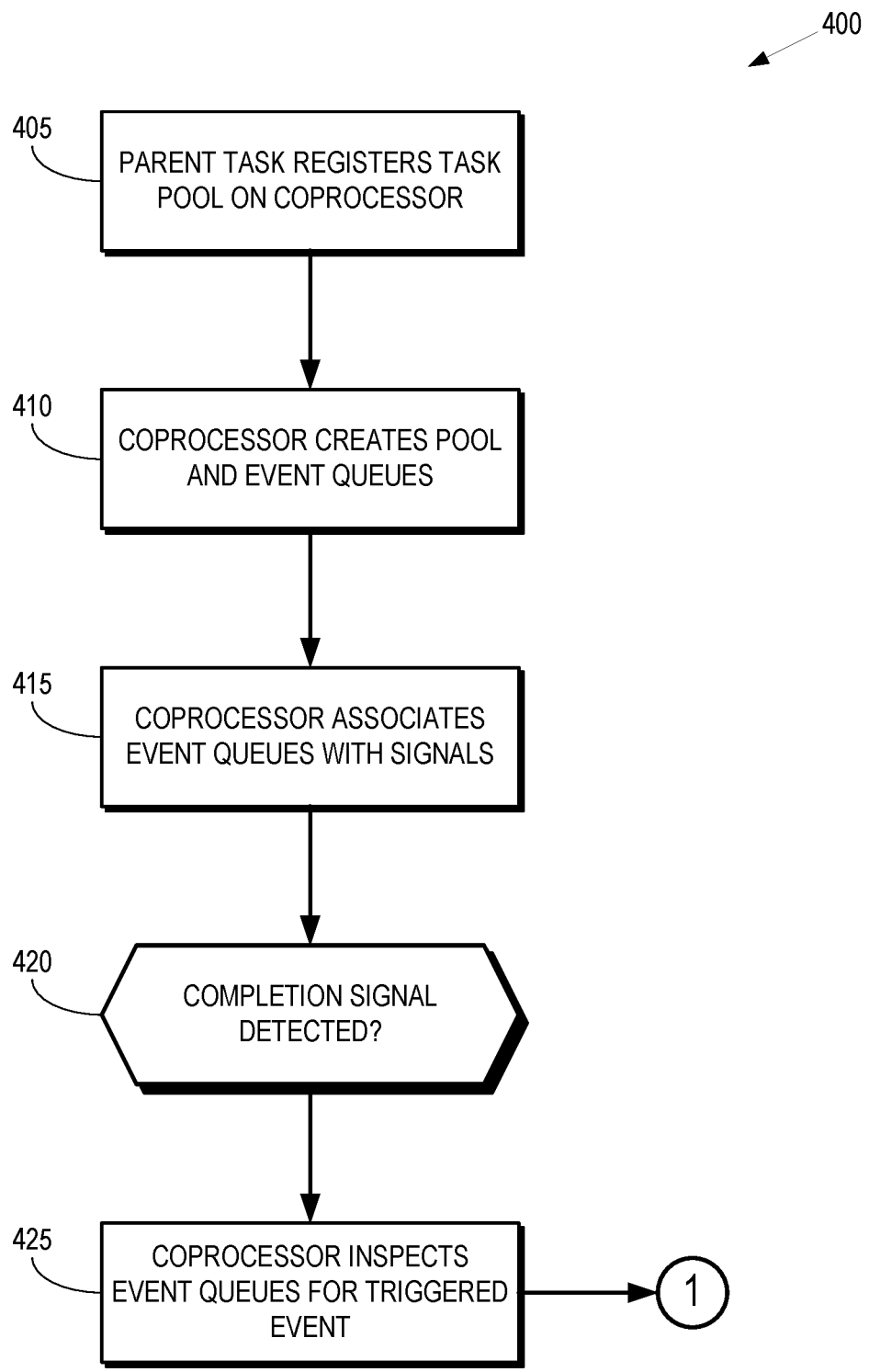
FIG. 4 is a flow diagram of a first portion of a method of managing a task pool of child tasks that are created by a parent task executing on a processing unit according to some embodiments.

FIG. 4 is a flow diagram of a first portion of a method 400 of managing a task pool of child tasks that are created by a parent task executing on a processing unit according to some embodiments. The method 400 is implemented in some embodiments of the GPU 115 shown in FIG. 1 and the GPU 205 shown in FIG. 2. The task pool is implemented using some embodiments of the task pool 305 shown in FIG. 3. However, as discussed herein, some embodiments of the task pool are implemented using an associative memory structure that associates the tasks in the task pool with corresponding priorities, as well as triggering events.

At block 405, the parent task registers the task pool on a coprocessor such as the coprocessor 160 shown in FIG. 1 and the coprocessor 210 shown in FIG. 2. For example, the parent task can register the task pool 225 with the coprocessor 210 shown in FIG. 2. The tasks that are created by the parent task and allocated to the task pool may be an entire kernel or a workgroup that is added to an execution context of the parent task.

At block 410, the coprocessor creates the task pool and a set of event queues such as the queues 310, 315, 320 shown in FIG. 3. Some embodiments of the coprocessor manage the task pool on a per-process basis (e.g., the task pool includes tasks associated with a process and other task pools are generated for other processes) or on a per-task basis (e.g., the task pool includes child tasks spawned by a particular parent task and other task pools are generated for other parent tasks). The coprocessor can then support task parallel, event-based programming model such as C++ executors, as discussed below. The coprocessor also provides an API for registering new tasks and associating them with events. Scheduling restrictions, data dependencies, and priorities can be associated with the tasks in the pool.

At block 415, the coprocessor associates the event queues with signals that indicate completion of the corresponding events, such as the signal 330, 335, 340 shown in FIG. 3. In some embodiments, the completion signals are implemented as Heterogeneous System Architecture (HSA) signals that are operated upon by HSA signaling primitives and are referenced using an opaque 64-bit signal handle. However, in other embodiments, the completion signals are implemented using interrupts, polling of a memory address, and the like.

At decision block 420, the coprocessor monitors the completion signals for events associated with tasks in the task pool. As long as no completion signals are detected, the coprocessor continues monitoring. If the coprocessor detects a completion signal that indicates that the event has occurred, the method 400 flows to block 425 and the coprocessor inspects the event queues in the task pool for the triggered event. The method 400 then flows to the node 1.

Figure 5:
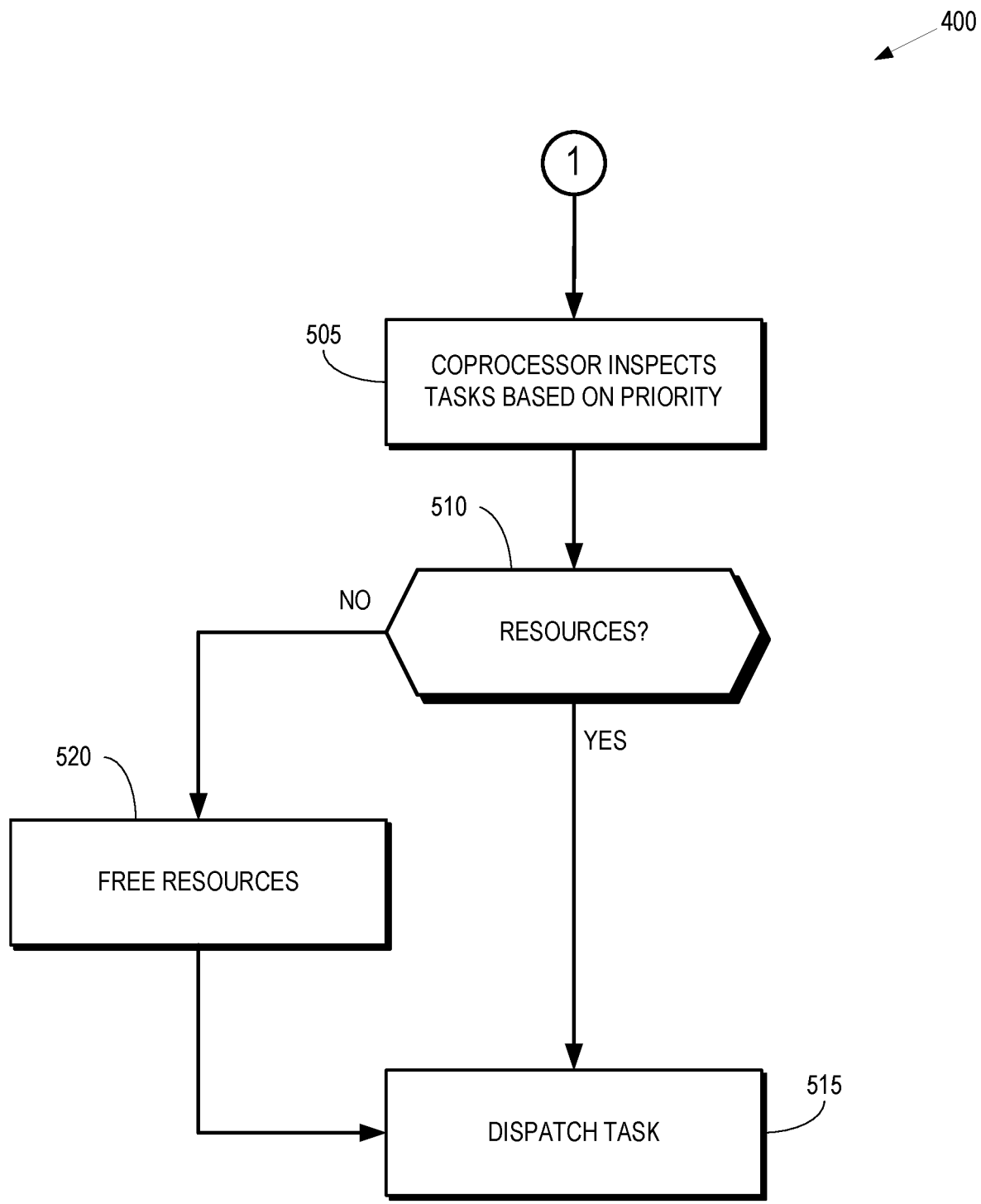
FIG. 5 is a flow diagram of a second portion of the method of managing the task pool of child tasks that are created by the parent task executing on the processing unit according to some embodiments.

FIG. 5 is a flow diagram of a second portion of the method 400 of managing the task pool of child tasks that are created by the parent task executing on the processing unit according to some embodiments. The second portion of the method 400 begins at node 1, which corresponds to node 1 shown in FIG. 4.

At block 505, the coprocessor inspects the task in the task queue associated with the triggering event to determine the task with the next highest priority. In some embodiments, priorities of the tasks are indicated by their position in the queue, in which case the coprocessor pops the next task off the top of the queue in response to detecting the triggering event. However, other techniques for indicating priorities of the tasks are used in some embodiments of the coprocessor and the task pool.

At decision block 510, the coprocessor determines whether there are sufficient resources available in the processing unit to execute the task associated with the triggering event. For example, the coprocessor can determine whether there are a sufficient number of compute units available to execute the task, a sufficient amount of free memory, and the like. If a sufficient amount of resources is available, the coprocessor dispatches the task for execution at block 515. Some embodiments of the task are dispatched to the GPU as an AQL packet. If the coprocessor determines that there are not sufficient resources to execute the task, the coprocessor frees resources for allocation to the task at block 520 before dispatching the task for execution at block 515. In some cases, the coprocessor stalls the task if all currently executing tasks have higher priority, or based on some other heuristic, e.g., a timeout-based back-off.

Some embodiments of the coprocessor are therefore responsible for managing all the data structures associated with the events and the tasks. For example, the coprocessor manages the event/task queues, task descriptors that include code pointers, priorities, input data, task sizes, task identifiers, and the like, as well as completion signals for each event or two. A process (or a signal kernel) makes API calls to the coprocessor to register event queues. The process or kernel also makes API calls to place tasks on the event queues and to trigger events.

Some embodiments of the method 400 are used to implement C++ executors that run on the coprocessor. The executors are dispatched and enqueued to the coprocessor as continuation tasks. Examples of continuation tasks are disclosed in Ser. No. 15/607,991 (AMD IDF: 160352), filed on May 30, 2017 and entitled "CONTINUATION ANALYSIS TASKS FOR GPU TASK SCHEDULING" which is incorporated herein by reference in its entirety. In some embodiments, a continuation task (or function) is launched in conjunction with launching the parent task onto a shader or GPU. Alternatively, the continuation task can be launched by another continuation task, e.g., to monitor a completion object. The kernel that owns the executor is also dispatched and enqueued using a packet such as an AQL packet. The executors are associated with events, e.g., the C++ code of the executor library can include event objects as member fields. As discussed herein, the events are triggered by interrupts, HSA signals or doorbells, or by monitoring regular memory addresses. The executors have execution semantics that are provided during creation of the executor such as thread pool executor, loop executor, system executor, and the like. The execution semantics determine the actions taken by the executors in response to a triggering event. The executors also coordinate scheduling and dependencies between parallel tasks.

A core executor API consists of a spawn operation, such as spawn(Func&&), which responds new work as denoted by the parameter Func. In response to a CPU or GPU task making a spawn( ) call for an executor, the core executor API triggers an event that is associated with a completion object such as an HSA signal/doorbell, memory address, interrupt, and the like that triggers the executor to perform work. Continuation functions wait in their corresponding queues for corresponding events to be triggered and, in response to triggering of an event, the continuation function performs the work of the executor. Once enqueued, some embodiments of continuation tasks perform self-enqueuing to avoid spinning on a memory address or using interrupts, as disclosed herein. The continuation function dequeues the AQL task or CPU task associated with the event and dispatches the task to the appropriate AQL queue using the GPU or CPU agent, respectively.

For a thread pool executor, as indicated in the execution semantics, the executor creates one more task queues in a memory of the coprocessor. The executor also assigns priorities to the queues. The pools created by the thread pool executor are associated with a single process or a single kernel. A continuation function enqueues a spawn task into the appropriate queue in response to triggering of an event to wake up the executor associated with the continuation function. The executor runs all the tasks in the pool and therefore continuously monitors the queues to detect work and spawn the highest priority tasks when possible. For example, the executor response tasks in response to determining that all the dependencies of the task are met and the associated AQL queues have free space to accept AQL packets. Tasks that depend upon each other are placed in the same queue to preserve dependencies, although the queues can be executed in any order using priorities to optimize scheduling.

For a loop executor, as indicated in the execution semantics, the executor continuously accumulates tasks until corresponding execution functions are called. Continuation functions in the coprocessor except and accumulate tasks in the memory of the coprocessor until the corresponding execution continuation functions are called. Some embodiments of the coprocessor implement an associative lookup table, referred to herein as the loop table, in memory with one entry per task in the loop. Each time a task is spawn, the executor on the coprocessor updates the table to demarcate that the task has been registered. The loop tables can include several entries per task such as a multi-map data structure. Keys into the table are identifiers of the loop task and the values represent the iterations of the loop for which a corresponding loop task is active. The continuation function triggers execution of some or all of the accumulated tasks in response to a triggering event. Loop tasks that have been marked for execution in the current iteration are executed in order. Some embodiments of the executor accept new tasks during execution of the loop, however the newly accepted tasks are scheduled for execution during the next execution of the loop.

For a serial executor, as indicated in the execution semantics, the executor executes tasks serially. The serial executor accepts a new task and then places the corresponding continuation function in a queue with a strict ordering priority. The queue is drained by executing the tasks in the order used by the continuation function to add the tasks to the queue.

For a system executor, as indicated in the execution semantics, the executor maintains a pool of tasks as a singleton so that all tasks from all kernels and processes execute from the same task. A series of queues with associated priorities are maintained for the system executor, which is required to provide forward progress guarantees. To support system executors that provide forward progress guarantees, the coprocessor exposes the task pool using an API such as the spawn( ) API described above, with the modification that all resources are shared by all kernels or processes. Deadlock occurs in situations such as head-of-line blocking by a task that needs resources held by a task that is unable to complete. The coprocessor therefore maintains a single queue that guarantees oldest-first execution semantics, and thus guarantees forward progress, in order to avoid deadlock scenarios. The queuing model can also be optimized to enhance performance.

Some embodiments of the coprocessor create and destroy queues in response to dispatch of processes or kernels. The coprocessor therefore virtualizes the queues and associates each queue with a unique identifier such as a process identifier, kernel identifier, and the like. The queues only accept tasks from the processor kernel that owns the queue. The tasks can therefore be ordered by age and guarantee forward progress. Some embodiments of the coprocessor manage a single queue for each priority level, although the coprocessor makes the queue associative in some cases. Head-of-line blocking is avoided by associating each entry in the queue with a process identifier or kernel identifier so that the queue can be searched to schedule the tasks in any order with respect to their queue. The method 500 shown in FIG. 5 is also used to implement some embodiments of a processing unit that supports futures such as C++ style futures.

Figure 6:
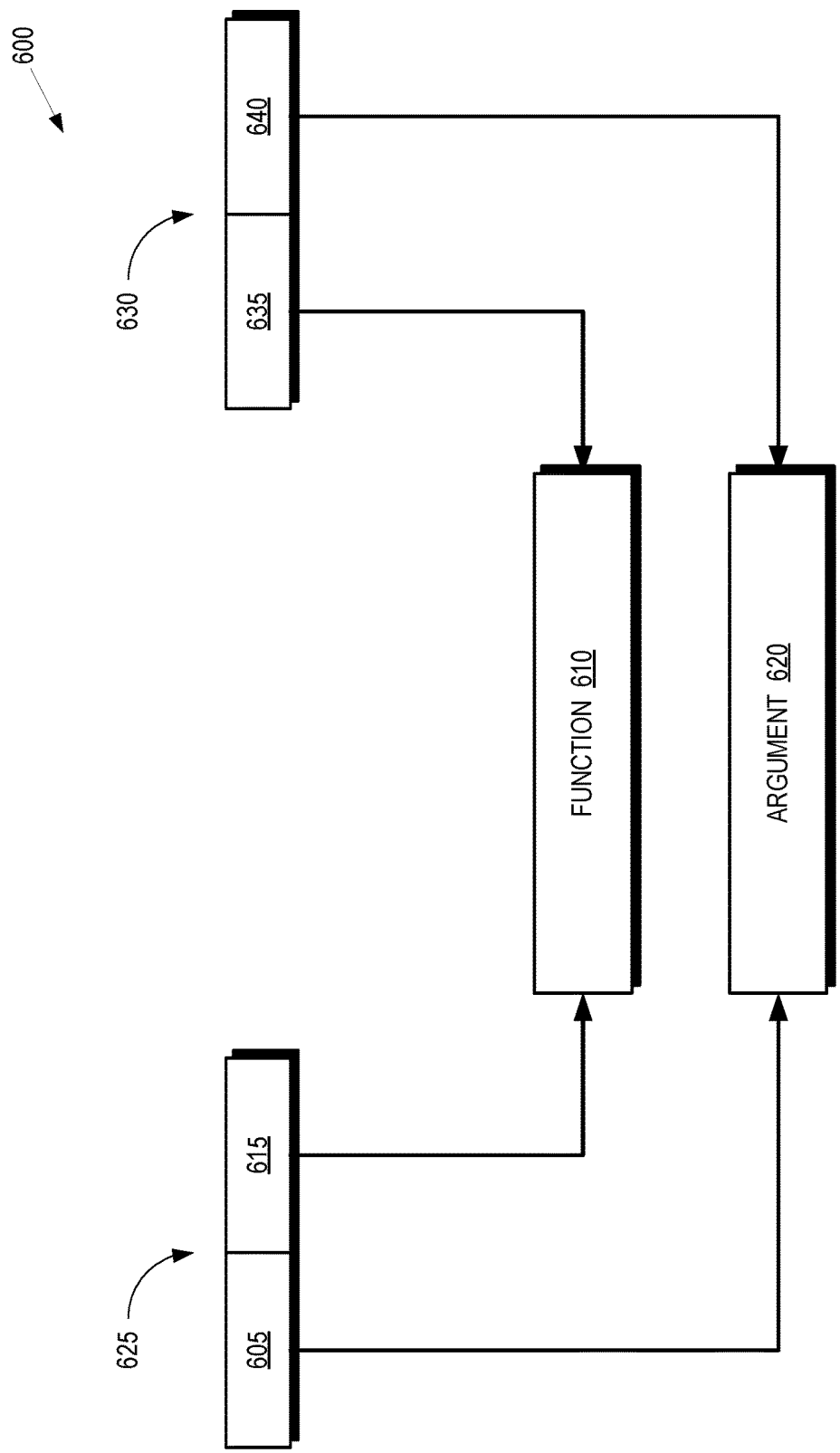
FIG. 6 is a block diagram that illustrates a future that performs self-enqueuing according to some embodiments.

FIG. 6 is a block diagram that illustrates a future 600 that performs self-enqueuing according to some embodiments. As used herein, the term "future" is a function that is used to defer execution of a task until a completion object for the future is satisfied. The task associated with the future is executed in response to detecting the completion function indicating that the future is completed. For example, the C++ future is declared as "std::future<bool> fut=std::async (is_prime,444444443);" where is_prime is a function that can run asynchronously. In this example, the function is_prime is a CPU function but it can be a data parallel GPU function as well. In other embodiments, the future 600 represents a future defined in another programming language.

The future 600 includes a pointer 605 that points to a function 610 and a pointer 615 that points to a function argument 620. The argument of the function includes a pointer to a completion object of the future. In some embodiments, a CPU function is treated as a CPU task and a data parallel function is treated as a GPU task. The functions are converted into tasks, e.g., by defining an appropriate AQL packet, which is executed asynchronously. The completion signal of the AQL packet is used for waiting on completion of the task. Some embodiments of the future 600 are implemented as a continuation function that is defined by a continuation packet 625 including the pointer 605 and the pointer 615. The continuation packet 625 is enqueued into a continuation queue that is maintained by a coprocessor such as the coprocessor 160 shown in FIG. 1 or the coprocessor 210 shown in FIG. 2. The coprocessor processes the continuation packet and runs the continuation function corresponding to that packet. The future continuation function monitors the associated completion object to determine if the future is completed. If the future is not completed, e.g., within a predetermined time interval, the continuation function "self-enqueues" by creating a new continuation function 630 that includes a pointer 635 to the same function 610 and a pointer 640 to the same function argument 620.

Figure 7:
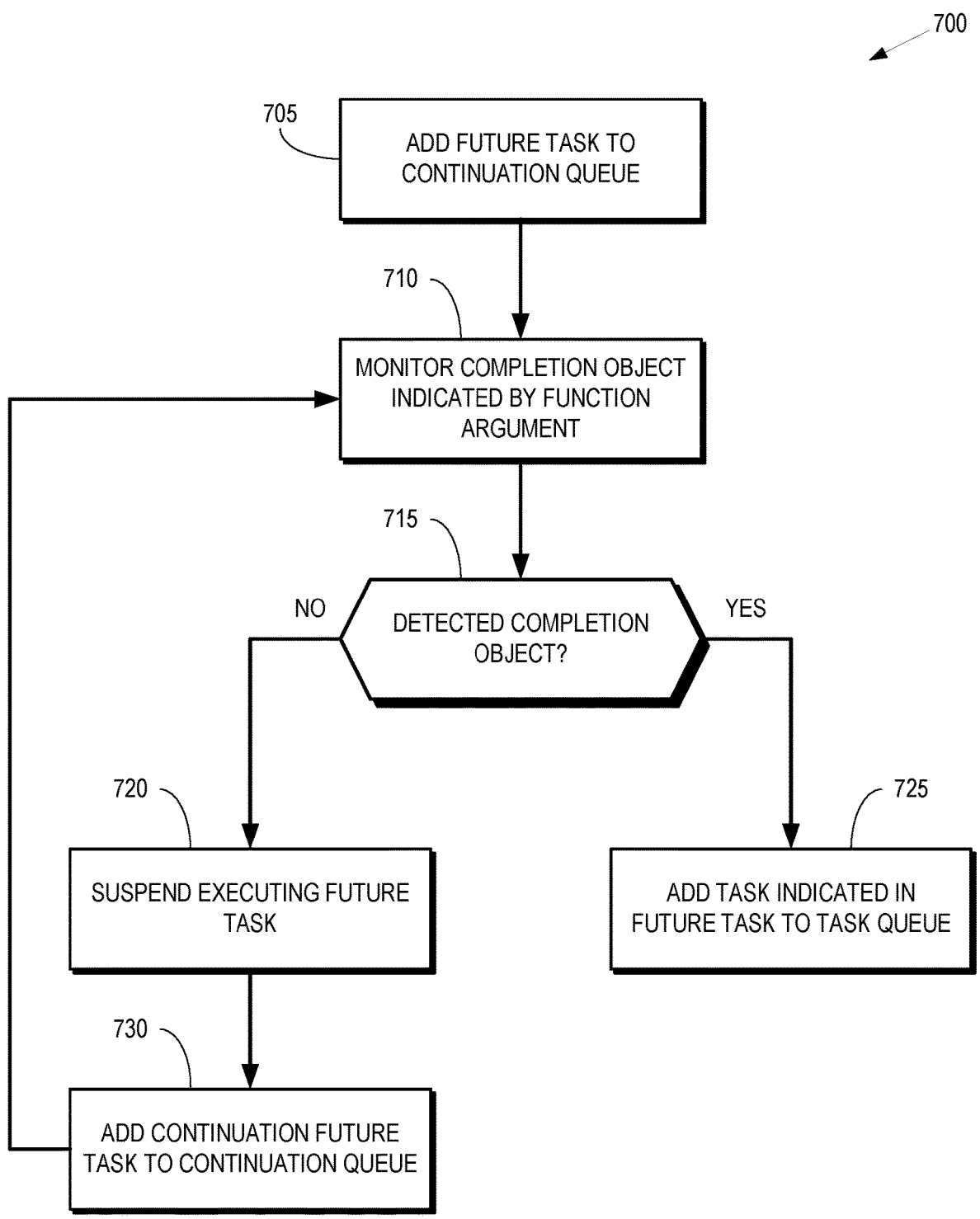
FIG. 7 is a flow diagram of a method of self-enqueuing continuation tasks according to some embodiments.

FIG. 7 is a flow diagram of a method 700 of self-enqueuing continuation tasks according to some embodiments. The method 700 is implemented in some embodiments of the coprocessor 160 shown in FIG. 1 and the coprocessor 210 shown in FIG. 2. The coprocessor implements a task pool that includes a queue for storing the continuation tasks prior to dispatch of the continuation tasks for execution by a processing unit such as a GPU. In the illustrated embodiment, the continuation tasks are used to implement futures such as the C++ futures disclosed herein. A continuation task that is used to implement a future is referred to herein as a "future task."

At block 705, the future task is added to a continuation queue maintained by a coprocessor. In some embodiments, the future task is enqueued in the continuation queue by adding the contents of an AQL packet to an entry of the continuation queue. As discussed herein, the continuation queue is associated with an event, which in this case is completion of a completion object indicated by a pointer in the future task that points to a function argument that identifies the completion object.

At block 710, the coprocessor monitors the completion object indicated by the function argument that is pointed to by the pointer in the future task. Monitoring the completion object is performed by monitoring an HSA signal or doorbell, waiting to detect an interrupt, monitoring a predetermined memory location, and the like.

At decision block 715, the coprocessor determines whether the completion object has been detected. Some embodiments of the coprocessor monitor the completion object for a predetermined time interval before determining whether the completion object has been detected. If the completion object is not detected, e.g., within the predetermined time interval, the method 700 flows to block 720. If the coprocessor detects the completion signal, the method 700 flows to block 725.

At block 720, the coprocessor suspends executing the future task in response to the failure to detect the completion object. The method 700 then flows to block 730 and the future task self-enqueues by generating a new future task with pointers to the same function and function argument. The new future task is then added to the continuation queue and the method 700 flows back to block 710. This method 700 iterates until the coprocessor detects (at decision block 715) the completion signal indicated by the self-enqueued future task.

At block 725, the coprocessor successfully detects the completion object and, in response, adds a task for the function indicated in the future task to a corresponding task queue. In some embodiments, the task is enqueued in the task queue by adding the contents of an AQL packet to an entry of the task queue. The task can be a CPU task or a GPU task, which can be enqueued on an HSA queue. The self-queue mechanism represented by the method 700 avoids spinning on a completion signal that otherwise would have blocked threads in the coprocessor. Implementing the self-enqueues mechanism allows the coprocessor to run continuation functions or other tasks that are enqueued on the continuation queue of the coprocessor.

Figure 8:
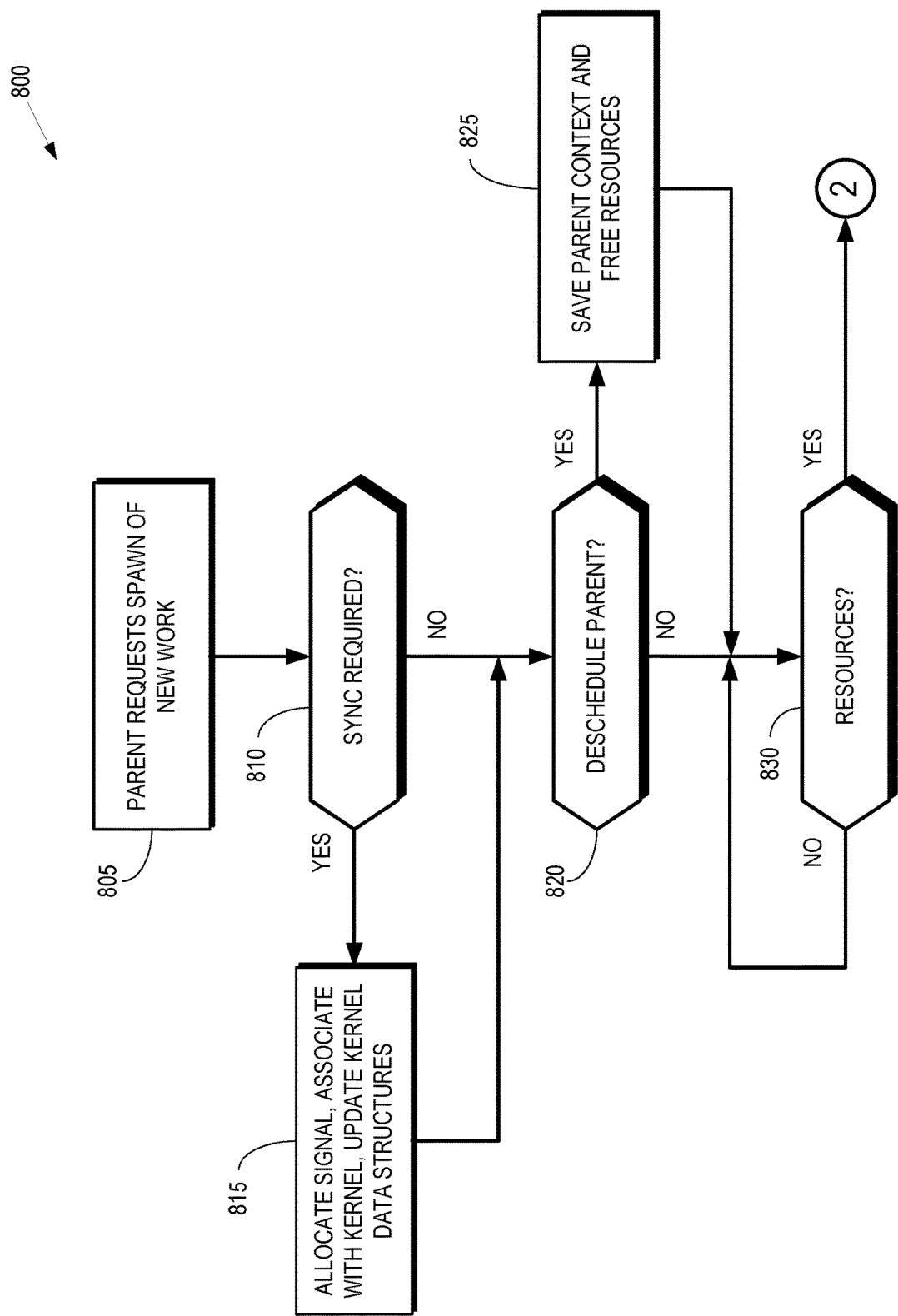
FIG. 8 is a flow diagram of a first portion of a method of dispatching child tasks that are generated by a parent task executing on a processing unit according to some embodiments.

FIG. 8 is a flow diagram of a first portion of a method 800 of dispatching child tasks that are generated by a parent task executing on a processing unit according to some embodiments. The method 800 is implemented in some embodiments of the coprocessor 160 shown in FIG. 1 and the coprocessor 210 shown in FIG. 2. In some embodiments, the parent task requests that the child task be added to the existing execution context of the parent task. Workgroups are therefore dynamically created and dispatched.

At block 805, a parent task requests that new work be spawned by spawning a child task concurrently with the parent task executing on the processing unit. The child task is added to the execution context of the parent task. For example, the kernel of the parent task, which is concurrently running on the GPU, makes an API call that is serviced by a coprocessor, such as a fork( ) call. Some embodiments of the method 800 are used to execute graphics workloads. A parent task that is traversing a graph may need to spawn additional work to operate on newly discovered or added data such as new graph nodes. One or more child tasks are then spawned and added to the execution context of the parent task to perform the operations on the new graph nodes. The child task can be handled synchronously or asynchronously with respect to the parent task. The coprocessor can add work at any granularity, e.g., workgroups that are executing in the kernel of the parent task can independently spawn new workgroups or the workgroups can work together to spawn several workgroups at once.

At decision block 810, the coprocessor determines if synchronization is required between the parent task and the child task. The coprocessor manages synchronization between the parent task and the child tasks and synchronization is expressed via an API for the coprocessor. If synchronization is required, the method 800 flows to block 815. If no synchronization is required, the method 800 flows to decision block 820.

At block 815, the coprocessor allocates a completion signal and associates the completion signal with the execution context of the kernel for the parent task. The completion signal is represented as an HSA signal that enforces the dependencies indicated by the synchronization. In other cases, the completion signal is implemented using interrupts or monitored memory addresses, as discussed herein. The parent task specifies when and where in the program code the parent task waits for one or more child tasks to complete. For example, the parent task can specify an HSA signal associated with the child tasks and the parent waits for the HSA signal to complete before proceeding. The coprocessor also updates the relevant hardware and software data structures associated with the kernel of the parent task to ensure that they reflect the newly added work for the child task. For example, data structures associated with the kernel are updated to identify the completion signal and the required synchronization. The method 800 then flows to decision block 820.

At decision block 820, the coprocessor determines whether to deschedule the parent task before executing the child task or allow the parent task to run concurrently with the child task. If the coprocessor decides to deschedule the parent task, the method 800 flows to block 825 and the parent context is saved. The resources used to execute the parent task are freed and made available to other tasks. The method 800 then flows to decision block 830. If the coprocessor decides not to deschedule the parent task, the method 800 flows directly to decision block 830.

At decision block 830, the coprocessor determines whether sufficient resources are available to execute the child task. The resources include memory, compute units, and the like. If sufficient resources are unavailable, the coprocessor waits until the resources needed to execute the available task become available. Once the coprocessor determines that sufficient resources are available, the method 800 flows to node 2.

Figure 9:
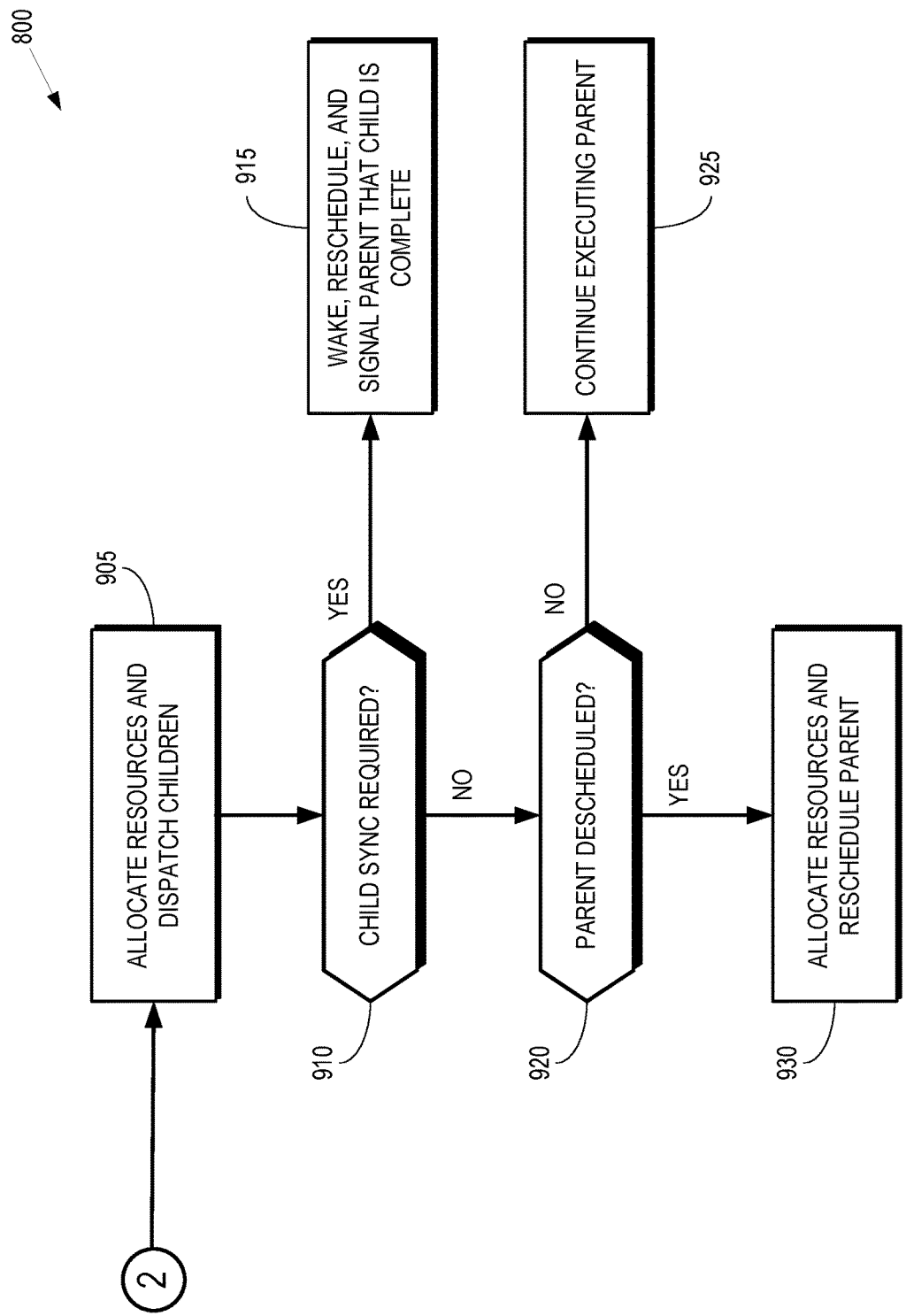
FIG. 9 is a flow diagram of a second portion of a method of dispatching child tasks that are generated by a parent task executing on a processing unit according to some embodiments.

FIG. 9 is a flow diagram of a second portion of the method 800 of dispatching child tasks that are generated by the parent task executing on the processing unit according to some embodiments. The second portion of the method 800 begins at the node 2, which corresponds to node 2 in FIG. 8.

At block 905, the coprocessor allocates resources to the child tasks and then dispatches the child tasks. Some embodiments of the coprocessor communicate with an SPI to create new workgroups for the child tasks and allocate resources such as register state, LDS space, global data store (GDS) space, wavefront slots, and the like. As discussed herein, the coprocessor can preempt running tasks to free resources needed to execute the child tasks. Some embodiments of the coprocessor preempt running tasks using a compute context wave save-restore (CWSR) mechanism. The dispatched child tasks execute on the corresponding processing unit until the child tasks complete execution. In response to completion of the child task, the method 800 flows to decision block 910.

At decision block 910, the coprocessor determines whether synchronization of the child task with the parent task is required. If so, the method 800 flows to block 915 and, if necessary, the coprocessor wakes the parent task and reschedules the parent task. The child task signals the parent task that the child task is complete. The child task notifies the coprocessor in response to synchronizing with the parent task. The coprocessor then notifies the parent task that synchronization is complete. If synchronization of the child task is not required, the method 800 flows to decision block 920.

At decision block 920, the coprocessor determines whether the parent task was previously descheduled. If the parent task was not previously descheduled, the method 800 flows to block 925 and the parent task continues executing on the processing unit. If the parent task was previously descheduled, the method 800 flows to block 930 and resources are allocated for execution of the parent task on the processing unit. The parent task is then rescheduled for execution on the processing unit.

Communication with the coprocessor during execution of the method 800 is performed via API calls that are implemented on the coprocessor. In some embodiments, the API calls are serviced by continuation tasks that are dispatched to the coprocessor at the time the parent task is dispatched. The APIs can also be serviced by persistent system code running on the coprocessor. API calls are initiated by ringing a doorbell signal on the coprocessor associated with the continuation task, using interrupts, by writing to regular memory addresses, using special GPU instructions such as a trap and a trap handler, or other techniques for initiating work on the coprocessor.

Some embodiments of the coprocessor run an operating system (OS) microkernel that treats the active tasks (either kernels or workgroups) in the same manner as a traditional OS executing on a host CPU handles a process. In that case, tasks may yield themselves when they encounter long latencies (e.g., latencies above a threshold) or blocking events. Implementing the microkernel is useful to allow GPU tasks to execute blocking system calls, allow for demand paging, and generally provide more dynamism. The coprocessor manages the state associated with each task (e.g., code pointers, data pointers, register state, and the like) and interrupts running tasks as necessary. For example, the coprocessor can interrupt running tasks on a time quanta basis, in response to a kernel yielding, and the like. Interrupting the running tasks is used to swap new tasks in and out.

In some embodiments, the apparatus and techniques described above are implemented in a system comprising one or more integrated circuit (IC) devices (also referred to as integrated circuit packages or microchips), such as the coprocessor described above with reference to FIGS. 1-9. Electronic design automation (EDA) and computer aided design (CAD) software tools may be used in the design and fabrication of these IC devices. These design tools typically are represented as one or more software programs. The one or more software programs comprise code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
in response to receiving, at a coprocessor of a processing system, a request from a parent task concurrently with the parent task executing on at least one processor core of the processing system, spawning a child task and registering the child task in a task pool stored at a memory of the processing system;
in response to registering the child task in the task pool, assigning the child task to an event queue of a plurality of event queues each corresponding to an event; and
in response to detecting the event associated with the event queue to which the child task is assigned, scheduling the child task for execution at the at least one processor core.

2. The method of claim 1, wherein the event queue is implemented as an associative memory structure of the coprocessor.

3. The method of claim 1, further comprising:
associating the child task with a priority; and
wherein scheduling the child task for execution comprises scheduling the child task for execution based on the priority.

4. The method of claim 1, further comprising:
associating, at the coprocessor, the plurality of event queues with completion signals that indicate completion of the corresponding event.

5. The method of claim 4, further comprising:
monitoring, at the coprocessor, the completion signals for a completed event;
identifying the event queue corresponding to the completed event;
in response to identifying the event queue corresponding to the completed event, identifying the priority associated with the child task in the event queue; and
in response to a priority associated with the child task being higher than priorities of other child tasks in the event queue, scheduling the child task for execution.

6. The method of claim 5, further comprising:
determining, at the coprocessor, whether there are sufficient resources available in the processing system to execute the child task scheduled for execution; and
in response to determining that there are sufficient resources available in the processing system to execute the child task, dispatching the child task for execution.

7. The method of claim 6, further comprising:
in response to determining that there are not sufficient resources available in the processing system to execute the child task, freeing resources by the coprocessor before dispatching the child task for execution.

8. A processing system comprising:
at least one processor core configured to execute a parent task; and
a coprocessor configured to dispatch a child task to the at least one processor core in response to the coprocessor receiving a request from the parent task concurrently with the parent task executing on the at least one processor core.

9. The processing system of claim 8, wherein the parent task is configured to register the child task in a task pool stored at a memory, and wherein the coprocessor is configured to manage the task pool.

10. The processing system of claim 9, wherein the child task in the task pool is added to a queue associated with an event, and wherein the child task is scheduled and dispatched in response to the coprocessor detecting the event.

11. The processing system of claim 10, wherein the coprocessor is configured to detect the event by monitoring a completion signal associated with the queue.

12. The processing system of claim 9, wherein the child task in the task pool is at least one of a kernel or a workgroup that is added to an execution context of the parent task.

13. The processing system of claim 10, wherein the coprocessor is configured to determine whether there are sufficient resources available in the processing system to execute the child task scheduled for execution and, in response to determining that there are sufficient resources available in the processing system to execute the child task, dispatch the child task for execution.

14. The processing system of claim 13, wherein the coprocessor is further configured to,
in response to determining that there are not sufficient resources available in the processing system to execute the child task, free resources before dispatching the child task for execution.

15. A system comprising:
at least one processor core configured to execute a parent task;
a coprocessor, associated with the at least one processor core, configured to schedule execution of a child task spawned from the parent task to the at least one processor core in response to the coprocessor receiving a request from the parent task concurrently with the parent task executing on the at least one processor core; and
a memory configured to store a task pool associated with the coprocessor, wherein the coprocessor is configured to schedule execution of the child task based on the task pool.

16. The system of claim 15, wherein the parent task is configured to register the child task in the task pool, and wherein the coprocessor is configured to manage the task pool.

17. The system of claim 15, wherein the child task in the task pool is added to a queue associated with an event, and wherein the child task is scheduled for execution in response to the coprocessor detecting the event.

18. The system of claim 17, wherein the coprocessor is configured to detect the event by monitoring a completion signal associated with the queue.

19. The system of claim 17, wherein the coprocessor is configured to determine whether there are sufficient resources available in the system to execute the child task scheduled for execution and, in response to determining that there are sufficient resources available in the system to execute the child task, dispatch the child task for execution.

20. The system of claim 19, wherein the coprocessor is further configured to, in response to determining that there are not sufficient resources available in the system to execute the child task, free resources before dispatching the child task for execution.

* * * * *

UNITED STATES PATENT AND TRADEMARK OFFICE
CERTIFICATE OF CORRECTION

PATENT NO. : 11,550,627 B2
APPLICATION NO. : 17/215171
DATED : January 10, 2023
INVENTOR(S) : Anthony Gutierrez and Sooraj Puthoor It is certified that error appears in the above-identified patent and that said Letters Patent is hereby corrected as shown below:

In the Claims

Column 15 Lines 41-42, correct "identifying the priority associated" to be --identifying a priority associated--

Column 15 Line 43, correct "in response to a priority" to be --in response to the priority--

Signed and Sealed this
Tenth Day of October, 2023

Katherine Kelly Vidal
*Director of the United States Patent and Trademark Office*